US012427082B2

(12) United States Patent
Liu

(10) Patent No.: US 12,427,082 B2
(45) Date of Patent: Sep. 30, 2025

(54) SUCTION DEVICES FOR PROVIDING SEXUAL PLEASURE

(71) Applicant: HYTTO PTE. LTD., Singapore (SG)

(72) Inventor: Dan Liu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 1006 days.

(21) Appl. No.: 17/497,877

(22) Filed: Oct. 8, 2021

(65) Prior Publication Data

US 2023/0116215 A1 Apr. 13, 2023

(51) Int. Cl.
*A61H 19/00* (2006.01)
*A61H 9/00* (2006.01)

(52) U.S. Cl.
CPC ........... *A61H 19/30* (2013.01); *A61H 9/0057* (2013.01); *A61H 19/34* (2013.01); *A61H 2201/1238* (2013.01); *A61H 2201/1418* (2013.01); *A61H 2201/50* (2013.01)

(58) Field of Classification Search
CPC ........ A61H 19/00; A61H 19/30; A61H 19/32; A61H 19/34; A61H 9/0057; A61H 2201/1418; A61H 9/0007; A61H 2201/0153; A61H 2201/0157; A61H 2201/123; A61H 2201/5005
See application file for complete search history.

(56) References Cited

U.S. PATENT DOCUMENTS

| | | | | |
|---|---|---|---|---|
| 8,734,322 | B2 | 5/2014 | Cordle | |
| 9,028,395 | B2 | 5/2015 | Jarzynski | |
| 9,763,851 | B2 | 9/2017 | Lenke | |
| 10,085,914 | B2 | 10/2018 | Murison | |
| 10,201,469 | B2 | 2/2019 | Gutierrez Villanueva | |
| 2018/0228690 | A1 * | 8/2018 | Hirsch | A61H 19/32 |
| 2023/0083660 | A1 * | 3/2023 | Raju | A61H 19/32 600/38 |

FOREIGN PATENT DOCUMENTS

| | | |
|---|---|---|
| EP | 2895135 | 3/2017 |

* cited by examiner

*Primary Examiner* — Samuel G Gilbert
(74) *Attorney, Agent, or Firm* — Holtz, Holtz & Volek PC

(57) ABSTRACT

A suction device includes a hollow body, an accumulator assembly and a drive mechanism. The accumulator assembly includes a first support structure and a second support structure, a plurality of connecting members and a flexible element. Each of the plurality of connecting members is mounted to the first and second support structures along circumference portions of the first and second support structures. The flexible element is disposed in a space defined by the first and second support structures and the plurality of connecting members. Further, the drive mechanism is configured to operate the flexible element to a compressed state and a retracted state by driving the second support structure between a first position and a second position relative to the first support structure, respectively.

20 Claims, 5 Drawing Sheets

SUCTION DEVICES FOR PROVIDING SEXUAL PLEASURE

TECHNICAL FIELD

The present disclosure relates generally to devices for sexual pleasure and, more particularly to, suction devices for providing sexual pleasure to female genitalia (or vagina).

BACKGROUND

Masturbation is generally referred to as a natural and safe way to explore one's body i.e. stimulation of genital organs to obtain sexual pleasure and releasing built-up sexual tension or stress.

Conventionally, the sex toys such as dildos are used by female users for masturbating. Conventional sex toys are generally simple and can have a vibration feature for enhancing the sexual stimulation of the female genital organs. In conventional sex toys, a degree of sexual stimulation may be manually controlled, for example, the sex toys may be configured with an on/off switch. However, as these conventional sex toys are self-operated and configured with limited settings, the individual (i.e. the female users) may not always feel the same level of stimulation at every instance by using the conventional sex toys. Additionally, as a tendency of arousal for the individuals may change based on their mood and environment, the stimulation produced by the sex toys with the vibration feature may not always provide desired results.

Hence, there exists a need to overcome the aforementioned drawbacks associated with the conventional devices for the sexual pleasure of the female users.

SUMMARY

Various embodiments of the present disclosure provide suction devices for providing sexual stimulation to female genitalia including but not limited to the vagina.

In an embodiment, a suction device is disclosed. The suction device includes a hollow body, an accumulator assembly and a drive mechanism. The accumulator assembly is housed within the hollow body. The accumulator assembly includes a first support structure and a second support structure, a plurality of connecting members and a flexible element. Each of the plurality of connecting members is mounted to the first and second support structures at regular intervals along circumference portions of the first and second support structures and oriented along a longitudinal axis of the accumulator assembly. Further, the flexible element includes a first end portion secured to the first support structure and a second end portion secured to the second support structure. The flexible element is disposed in a space defined by the first and second support structures and the plurality of connecting members. Further, the drive mechanism is operatively coupled to the accumulator assembly. The drive mechanism is configured to operate the flexible element to a compressed state and a retracted state by driving the second support structure between a first position and a second position relative to the first support structure, respectively.

In another embodiment, a suction device is disclosed. The suction device includes a hollow body, an accumulator assembly and a drive mechanism. The accumulator assembly is housed within the hollow body. The accumulator assembly includes a first support structure and a second support structure, a plurality of connecting members and a flexible element. Each of the plurality of connecting members is mounted to the first and second support structures at regular intervals along circumference portions of the first and second support structures and oriented along a longitudinal axis of the accumulator assembly. Further, the flexible element includes a first end portion secured to the first support structure and a second end portion secured to the second support structure. The flexible element is disposed in a space defined by the first and second support structures and the plurality of connecting members. Further, the drive mechanism is operatively coupled to the accumulator assembly. The drive mechanism includes a rotating cam. The rotating cam includes an inclined surface and a base surface. Further, the drive mechanism includes a reciprocating link including a primary end movably coupled to the inclined surface and a secondary end coupled to the second support structure. The drive mechanism further includes an actuator. The actuator includes a shaft connector operatively coupled to the base surface of the rotating cam. The actuator is configured to provide a rotary motion to the shaft connector and the rotating cam. Further, the drive mechanism is configured to operate the flexible element to a compressed state and a retracted state by driving the second support structure between a first position and a second position relative to the first support structure, respectively.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

Figure 1:
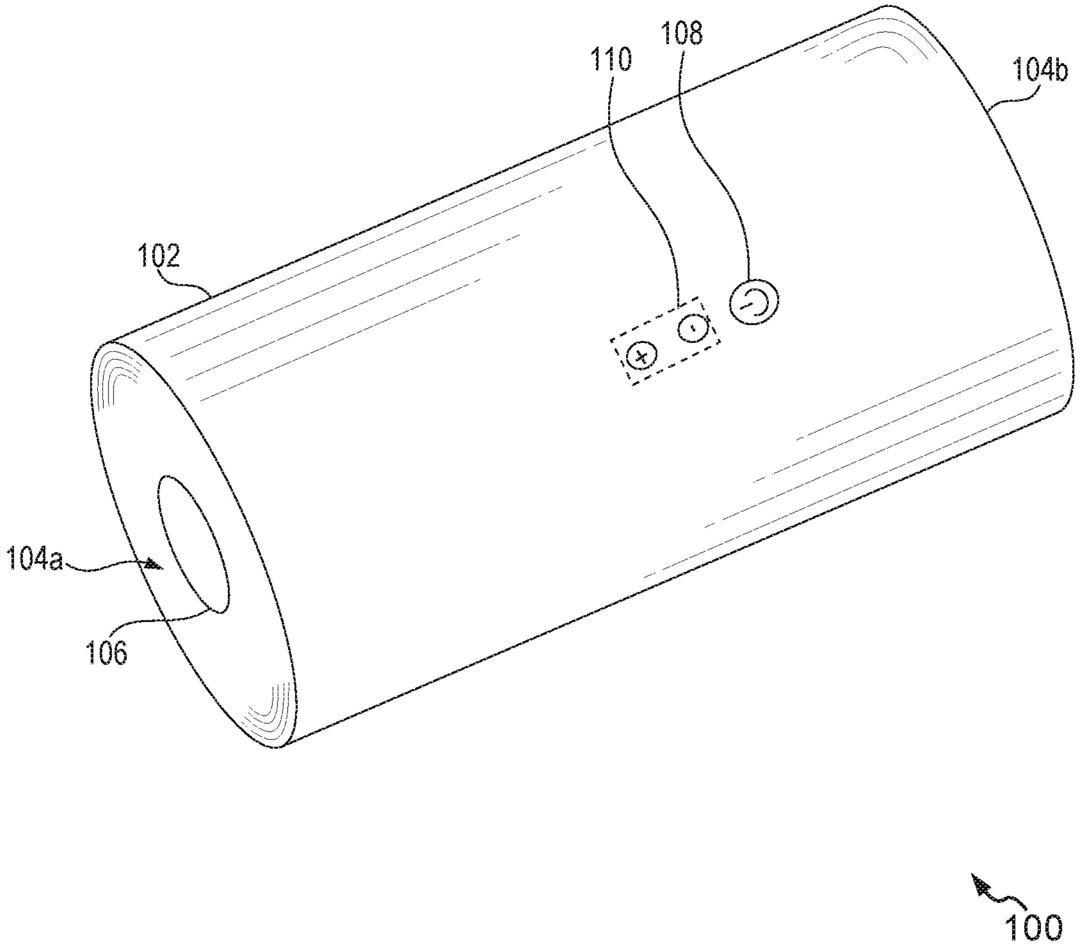
FIG. 1 illustrates a perspective view of a suction device, in accordance with an example embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide a suction device for providing sexual stimulation to female genitalia (e.g., vagina and surrounding areas) and other erogenous zones such as nipples. In at least one embodiment, the suction device includes a hollow body configured to encase one or more internal components of the suction device. The suction device further includes an accumulator assembly housed within the hollow body. The accumulator assembly includes a first support structure and a second support structure, a plurality of connecting members and a flexible element. The connecting members are mounted to the first and second support structures at regular intervals along circumference portions of the first and second support structures and oriented along a longitudinal axis of the accumulator assembly. Further, the flexible element is disposed in a space defined by the first and second support structures and the plurality of connecting members. The suction device further includes a drive mechanism that is operatively coupled to the accumulator assembly. The drive mechanism includes a rotating cam including an inclined surface and a base surface, a reciprocating link and an actuator. The actuator includes a shaft connector that is operatively coupled to the base surface of the rotating cam. The actuator is configured to provide a rotary motion to the shaft connector and the rotating cam. As such, the rotary motion of the rotating cam facilitates the reciprocating link to traverse between a first point and a second point on the inclined surface along a horizontal plane of the rotating cam which drives the second support structure to a first position and a second position relative to the first support structure, respectively. As a result, the flexible element is operated in a compressed state and a retracted state due to the second support structure being operated in the first position and the second position, respectively. The continuous operation of the flexible element in the compressed state and the retracted state facilitates sexual stimulation of the female genitalia (or vagina), thus enabling female users to feel enhanced sexual pleasure and a satisfying masturbating experience.

Various embodiments of the present invention are described hereinafter with reference to FIG. 1 to FIG. 5.

FIG. 1 illustrates a perspective view of a suction device 100, in accordance with an embodiment of the present disclosure. The suction device 100 is generally referred to sucking vibrators or clitoral sucking toys or clit sucker for stimulating female genitalia (e.g., vagina, clitoris and surrounding regions) and/or nipples. The suction device 100 generally mimics and/or imitates inspiratory and expiratory effects of a human mouth for providing sexual stimulation to vagina. In other words, the suction device 100 is designed to simulate realistic oral pleasure, and sucks the clitoris or vagina to provide satisfying masturbating experience to female users which is explained further in greater detail.

As shown, the suction device 100 (hereinafter interchangeably referred to as 'the device 100') includes a hollow body 102 having a proximal portion 104*a* and a distal portion 104*b*. The hollow body 102 corresponds to a housing configured to encase and/or house one or more components of the device 100. The hollow body 102 is configured to be a hollow cylindrical structure. The hollow body 102 is made of a suitable material such as, but not limited to, plastic, metal, rubber, wood and any combination thereof. Further, the hollow body 102 may be made of a suitable manufacturing technique, for example, extrusion, molding and so forth.

The proximal portion 104*a* of the hollow body 102 is configured with a central opening 106. The central opening 106 is configured to allow passing of air therethrough. In other words, the proximal portion 104*a* of the device 100 is an open configuration of the proximal portion 104*a*. Further, the distal portion 104*b* is a closed configuration. In an embodiment, the hollow body 102 may be configured to resemble the human mouth.

In one embodiment, the device 100 may include a cap (not shown in Figures) for openably closing the proximal portion 104*a* after the use of the device 100. It should be understood that the distal portion 104*b* may also include the cap which may be integral or detachably coupled with the distal portion 104*b* for constituting the closed configuration thereof. In an embodiment, the hollow body 102 may be configured with indentations (not shown in Figures) on its outer surface for enhancing grip of the device 100 to a subject (or the female user) during use.

It is evident that the hollow body 102 is a unitary structure. Alternatively, the hollow body 102 may be configured with a plurality of elements (not shown in Figures). Specifically, the plurality of elements may be detachably coupled with each other using suitable coupling mechanism such as, but not limited to, screws, snap-fit arrangement, and so forth, to form the hollow body 102. In an example scenario, the plurality of elements may be configured to have a shape that is substantially similar to a shape of a longitudinal half-portion of a hollow cylindrical structure which may be detachably coupled with each other to form the hollow body 102. This configuration of detachable coupling of the plurality of elements to form the hollow body 102 allows in accessing one or more structural components encased and/or housed within the hollow body 102.

Figure 2:
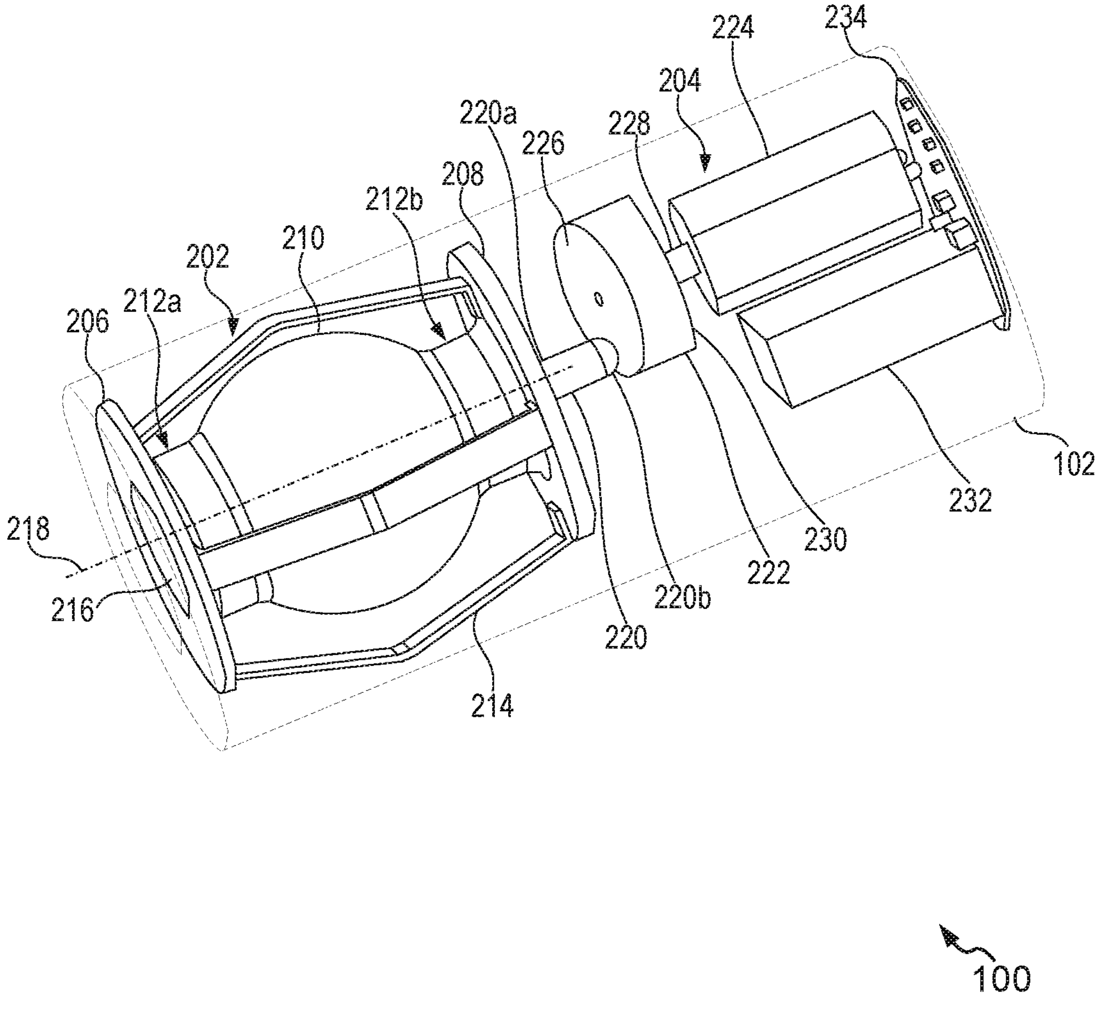
FIG. 2 illustrates a schematic representation of internal components of the suction device housed in a hollow body, in accordance with an example embodiment of the present disclosure.

FIG. 2 illustrates a schematic representation of internal components of the suction device 100 housed in the hollow body 102, in accordance with an example embodiment of the present disclosure. The hollow body 102 is depicted in dashed lines for illustration purpose. The internal components of the device 100 include one of the accumulator assembly 202 and a drive mechanism 204.

The accumulator assembly 202 includes a first support structure 206 and a second support structure 208. The first support structure 206 is mounted to the proximal portion 104*a* using suitable mounting means such as, but not limited to, adhesives or fixative, screws, snap-fit arrangement, and the like. The first and second support structures 206 and 208 are configured as a circular plate like structure. The dimensions (or the circumferences) of the first and second support structures 206 and 208 are configured in conformity with the dimension (for example, an inner diameter) of the hollow body 102 to ensure snug-fit of the accumulator assembly 202 within the hollow body 102. In an embodiment, the first and second support structures 206 and 208 may be configured with any other geometric shape as per design feasibility and requirement.

Further, the accumulator assembly 202 includes a flexible element 210 and a plurality of connecting members 214. The flexible element 210 includes a first end portion 212*a* and a second end portion 212*b*. The first end portion 212*a* is secured to the first support structure 206 and the second end portion 212*b* is secured to the second support structure 208. It should be noted that each of the connecting members 214 is mounted to the first and second support structures 206 and 208 at regular intervals along circumference portions of the first and second support structures 206 and 208. In other words, the connecting members 214 are arranged in a circular manner around the flexible element 210. The connecting members 214 are mounted to the first and second support structures 206 and 208 by using suitable mounting means. The connecting members 214 mounted to the first and second support structures are oriented along a longitudinal axis 218 of the accumulator assembly 202. It is evident that the flexible element 210 is disposed in a space defined by the first and second support structures 206 and 208 and the connecting members 214.

The flexible element 210 is configured with a bore 216. Specifically, the bore 216 is aligned coaxially with an orifice configured in the first support structure 206 and the central opening 106 configured at the proximal portion 104*a* of the hollow body 102 when the flexible element 210 is secured to the first and second support structures 206 and 208. In other words, the first support structure 206 is an open configuration (i.e. configured with the orifice) for facilitating inspiratory and expiratory effects when the flexible element 210 undergoes elastic deformation which is further explained in detail. Further, the second support structure 208 is a closed configuration. In one configuration, the flexible element 210 is made of silicone. Alternatively, the flexible element 210 can be made of other materials which possess flexibility or elasticity.

Thus, it should be understood that the flexible element 210 is configured to undergo elastic deformation. The elastic deformation of the flexible element 210 produces the inspiratory and expiratory effects for providing sexual stimulation to the vagina when the device 100 is positioned at vicinity of the vagina. Providing sexual stimulation to the female genitalia (or vagina) by operating the suction device 100 is further explained in detail with references to FIGS. 3, 4 and 5.

Further, the drive mechanism 204 is operatively coupled to the accumulator assembly 202. The drive mechanism 204 is configured to operate the flexible element 210 to a compressed state (see, 306 of FIG. 3) and a retracted state (see, 406 of FIG. 4) by driving the second support structure 208 between a first position (see, 302 of FIG. 3) and a second position (see, 402 of FIG. 4) relative to the first support structure 206, respectively.

More specifically, the drive mechanism 204 includes a reciprocating link 220, a rotating cam 222 and an actuator 224. The reciprocating link 220 includes a primary end 220*a* movably coupled to an inclined surface 226 of the rotating cam 222 and a secondary end 220*b* coupled to the second support structure 208. The inclined surface 226 of the rotating cam 222 may be configured with a groove structure (not shown in Figures) for enabling mounting of the reciprocating link 220. As such, the reciprocating link 220 reciprocates in the groove structure for operating the accumulator assembly 202 which will be explained further in detail. Further, the actuator 224 includes a shaft connector 228. The shaft connector 228 is operatively coupled to a base surface 230 of the rotating cam 222. The actuator 224 corresponds to a motion transmission mechanism (for example, a motor). The actuator 224 operatively coupled to the rotating cam 222 via the shaft connector 228 is configured to provide a rotary motion to the shaft connector 228 and the rotating cam 222. The rotary motion of the rotating cam 222 facilitates the reciprocating link 220 to reciprocate on the inclined surface 226 which will be explained with reference to FIGS. 3, 4 and 5.

The device 100 further includes a power source 232. The power source 232 is configured to provide electrical power to one or more operating components (for example, the actuator 224) of the device 100. The power source 232 is arranged proximal to the distal portion 104*b* of the hollow body 102. The power source 232 may be configured to provide one of an alternating current output or a direct current output. In an embodiment, the power source 232 includes a direct current power source, such as a rechargeable battery (for example, a lithium-ion (Li-on) battery), operable to provide the required electrical power for the operation of the actuator 224. Further, the power source 232 may include electrical and/or electronic components or circuits for enabling use of wired or wireless charging. Alternatively, the power source 232 may include electrical and/or electronic components or circuits for enabling use of alternating current to provide the required electrical power for the operation of the actuator 224.

Further, the device 100 includes a control circuitry 234 (e.g., a printed circuit board (PCB)) housed within the hollow body 102 and communicably coupled to the operating components of the device 100. The control circuitry 234 may include one or more electrical and electronic components or circuits for operating the device 100. Specifically, the control circuitry 234 may be configured to detect user inputs provided on a user interface for example, a power button (see, 108) and intensity control buttons (see, 110) configured in the device 100. Based on detection of the inputs, the control circuitry 234 provides control signals to the operating components (for example, the actuator 224) for operating the device 100.

Figure 3:
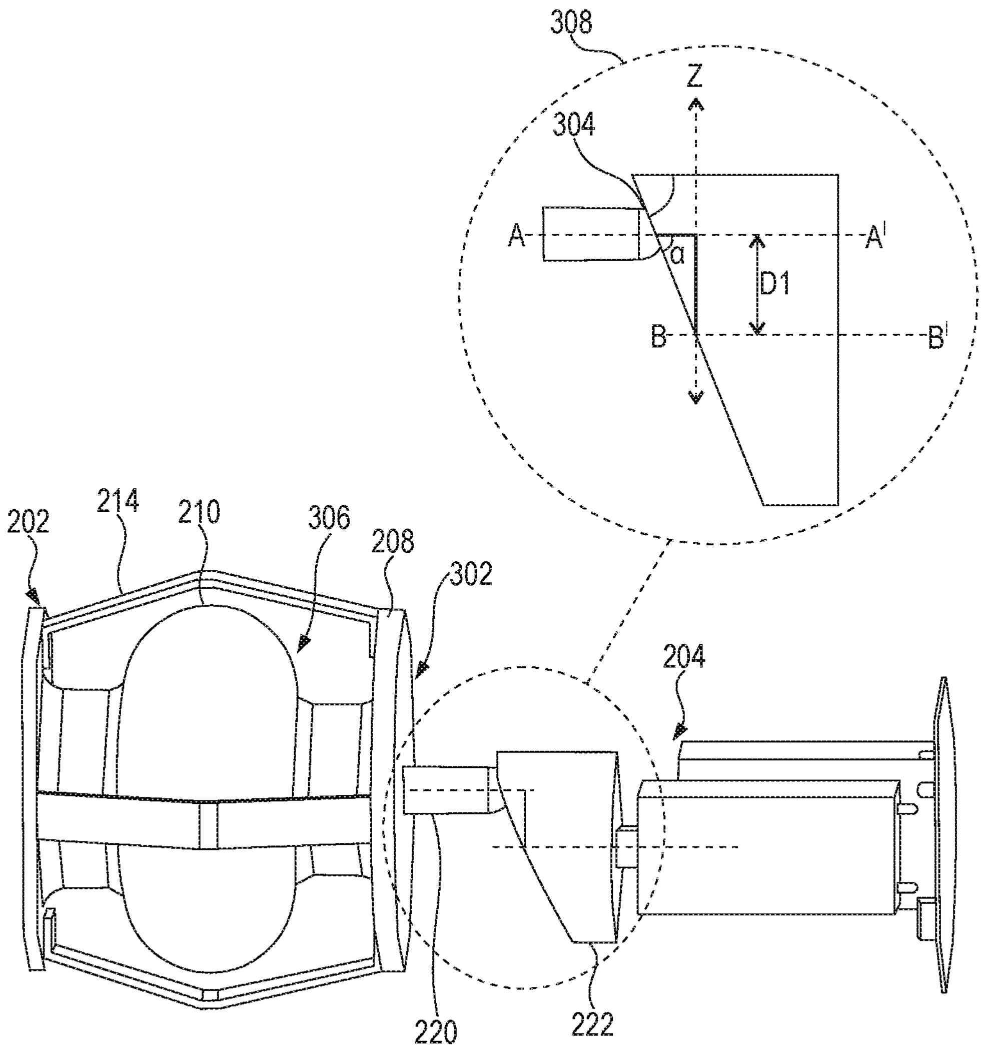
FIGS. 3, 4 and 5, represent operational views of the internal components of the suction device, in accordance with an example embodiment of the present disclosure.

Referring to FIG. 3, a side view of the internal components of the device 100, depicting the second support structure 208 operated to the first position 302 is illustrated, in accordance with an example embodiment of the present disclosure. As explained above, the actuator 224 is configured to provide the rotary motion to the shaft connector 228 which further enables the rotating cam 222 to rotate. As such, the reciprocating link 220 is configured to reciprocate between a first point (see, 304 of FIG. 3) and a second point (see, 404 of FIG. 4) on the inclined surface 226 along a horizontal plane 'Z' of the rotating cam 222 due to rotational movement of the rotating cam 222.

As shown in FIG. 3, the reciprocating link 220 is operated to the first point 304 on the inclined surface 226 due to rotation of the rotating cam 222. At this point, the second support structure 208 is displaced by a distance while the reciprocating link 220 is operated to the first point 304 on the inclined surface 226. Specifically, the reciprocating link 220 operated to the first point 304 on the inclined surface 226 of the rotating cam 222 drives the second support structure 208 to the first position 302 relative to the first support structure 206. To that effect, the flexible element 210 is operated to the compressed state 306. In particular, the flexible element 210 is operated to the compressed state 306 by blowing out air from within the flexible element 210 (i.e. expiratory effect) through the orifice of the first support structure 206 and the central opening 106 of the hollow body 102.

It is to be noted that the movement of the reciprocating link 220 to the first point 304 on the inclined surface 226 results in a first eccentric distance 'D1' between a first central axis A-A' of the rotating cam 222 and a second central axis B-B' of the reciprocating link 220 (see, a magnified portion 308, depicting a simplified diagram of the rotating cam 222). In an embodiment, the first central axis A-A' may be the central axis of the actuator 224. As such, the rotating cam 222 rotates around the first central axis A-A' due to rotary motion caused by the actuator 224. The reciprocating link 220 is traversed to the first point 304 due to half rotation of the rotating cam 222 around the first central axis A-A', thereby causing the second support structure 208 to operate in the first position 302 which facilitates the flexible element 210 to be operated in the compressed state 306. It is obvious that the first point 304 refers to a squeeze point as the flexible element 210 is operated to the compressed state 306 to provide the expiratory effect.

As explained above, the first eccentric distance 'D1' refers to a horizontal distance between the first central axis A-A' and the second central axis B-B' caused due to the displacement of the reciprocating link 220 to the first point 304 on the inclined surface 226 along the horizontal plane 'Z'. Further, the first eccentric distance 'D1' may be a radius 'R' of the rotating cam 222 (or may be in the range of [0, R], where R is the radius of the rotating cam 222). In this scenario, the displacement of the reciprocating link 220 to the first point 304 from a central point on the inclined surface 226 corresponds to half horizontal displacement. The half horizontal displacement on the inclined surface 226 of the rotating cam 222 can be computed using the following equation (Eq. 1):

$$\text{Half horizontal displacement} = (\text{first eccentric distance } (D1)/\tan(\alpha)) \qquad \text{Eq. 1}$$

Wherein,

'α' is an angle of an imaginary triangle (see, magnified portion 308), the imaginary triangle is formed due to displacement of the reciprocating link 220 to the first point 304 from the central point on the inclined surface 226 of the rotating cam 222.

Figure 4:
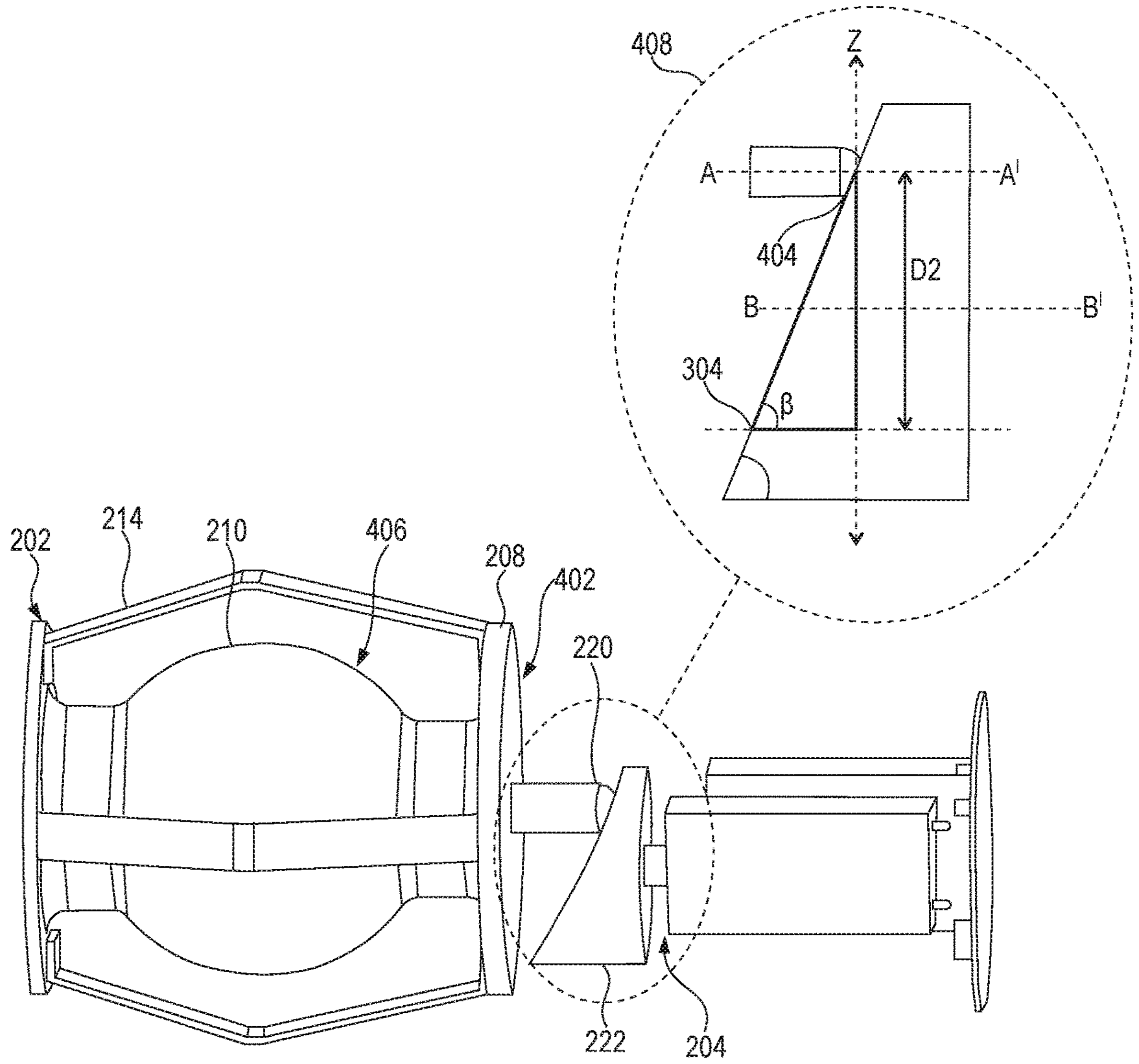

Referring to FIG. 4, the side view of the internal components of the device 100, depicting the second support structure 208 operated to the second position 402 is illustrated, in accordance with an example embodiment of the present disclosure. As shown, the reciprocating link 220 is operated to the second point 404 on the inclined surface 226 of the rotating cam 222 due to further rotation of the rotating cam 222. Specifically, the reciprocating link 220 operated to the second point 404 on the inclined surface 226 of the rotating cam 222 drives the second support structure 208 to the second position 402 relative to the first support structure 206. To that effect, the flexible element 210 is operated to the retracted state 406. In particular, the flexible element 210 is operated to the retracted state 406 by drawing air within the flexible element 210 (i.e. inspiratory effect) through the orifice of the first support structure 206 and the central opening 106 of the hollow body 102.

It is to be noted that the movement of the reciprocating link 220 to the second point 404 from the first point 304 on the inclined surface 226 results in a second eccentric distance 'D2' (see, a magnified portion 408). The reciprocating link 220 is traversed from the first point 304 to the second point 404 due to further rotation (or one complete rotation) of the rotating cam 222 around the first central axis A-A', thereby causing the second support structure 208 to operate in the second position 402 which facilitates the flexible element 210 to be operated in the retracted state 406. It is obvious that the second point 404 refers to a stretch point as the flexible element 210 is operated to the retracted state 406 to provide the inspiratory effect.

As explained above, the second eccentric distance 'D2' refers to a horizontal distance between the first point 304 and the second point 404 which is caused due to the displacement of the reciprocating link 220 from the first point 304 to the second point 404 on the inclined surface 226 along the horizontal plane 'Z'. Further, the second eccentric distance 'D2' may be twice the radius 'R' (or 2R) of the rotating cam 222. In this scenario, the displacement of the reciprocating link 220 from the first point 304 to the second point 404 corresponds to full horizontal displacement. The full horizontal displacement on the inclined surface 226 of the rotating cam 222 can be computed using the following equation (Eq. 2):

$$\text{Horizontal displacement} = 2 \times (\text{second eccentric distance}(D2)/\tan(\beta)) \qquad \text{Eq. 2}$$

Wherein,

'β' is an angle of an imaginary triangle (see, magnified portion 408), the imaginary triangle is formed due to displacement of the reciprocating link 220 from the first point 304 to the second point 404 on the inclined surface 226 of the rotating cam 222.

Figure 5:
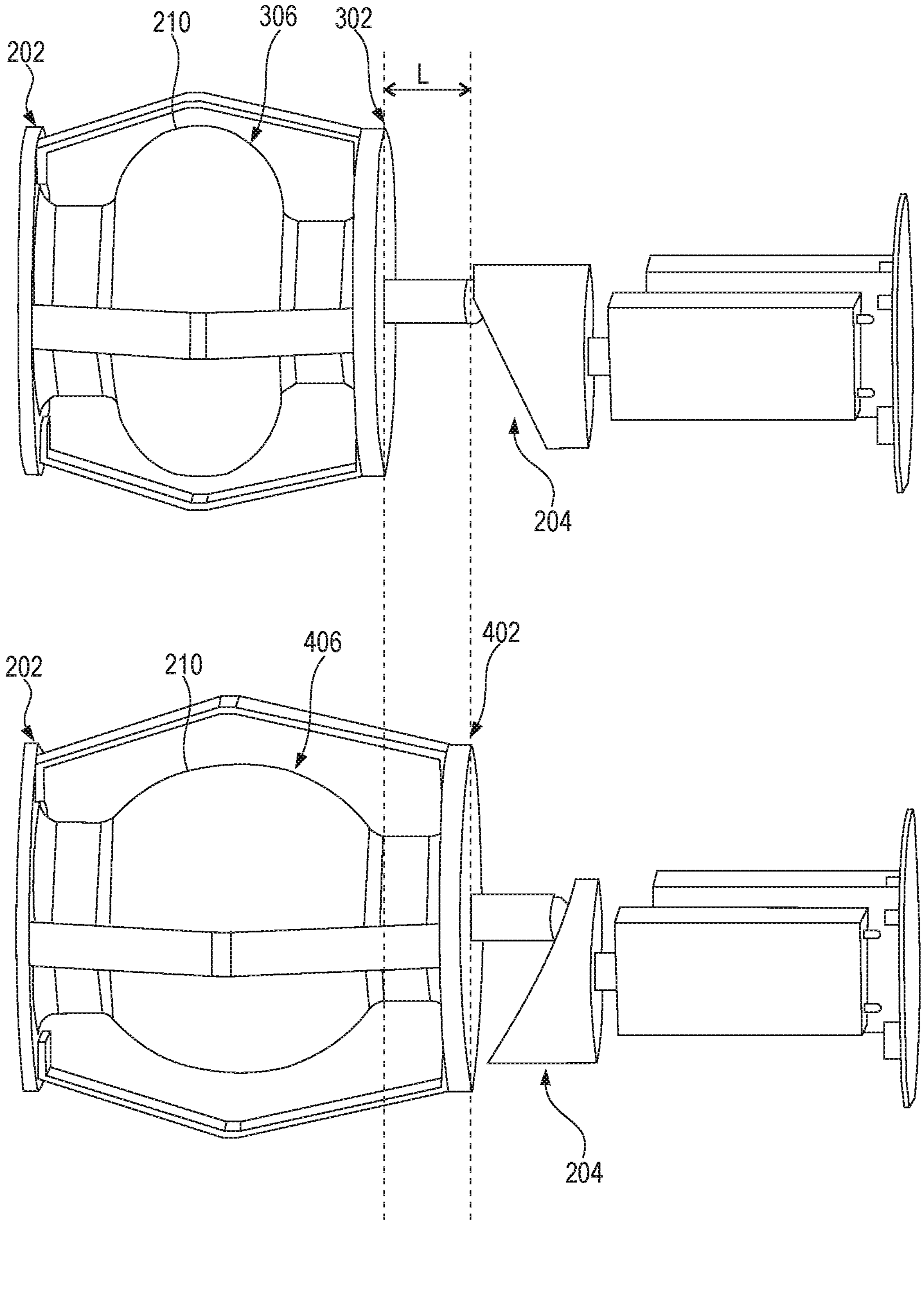

Thus, it is understood that, when the rotating cam 222 is rotating, the reciprocating link 220 is operable between the first point 304 (i.e. a position where the flexible element 210 is squeezed most) and the second point 404 (i.e. a position where the flexible element 210 is stretched most). Further, the displacement of the second support structure 208 from the first position 302 to the second position 402 corresponds to a stroke length 'L' (as shown in FIG. 5). It is to be understood that the stroke length 'L' depends on the reciprocating motion caused by the reciprocating link 220 due to the rotary motion of the rotating cam 222 and the actuator 224.

Furthermore, the movement of the second support structure 208 due to reciprocating motion of the reciprocating link 220 is caused due to the connecting members 214. As shown in FIGS. 3 and 4, it is evident that the connecting members 214 are configured to adapt their length and shape due to movement of the second support structure 208 between the first position 302 and the second position 402 for configuring the flexible element 210 to operate in the compressed state 306 and the retracted state 406, respectively. In one configuration, the connecting members 214 may be made of flexible materials (or malleable materials) that have sufficient mechanical strength to hold the mechanical contact between the second support structure 208, the reciprocating link 220 and the inclined surface 226 of the rotating cam 222. Some non-limiting examples of the connecting members 214 may be, but not limited to, metals like aluminum, cast iron, lead, copper and the like.

In use or operation of the suction device 100 of the present disclosure, the female user may operate the suction device 100 upon positioning the suction device 100 at the vicinity of the female genitalia (such as vagina). The suction device 100 is operated based on providing input on the power button 108 configured in the device 100. Based on providing the input, the control circuitry 234 provides the control signals to operate the actuator 224 for enabling the flexible element 210 to be operated in the compressed state 306 and the retracted state 406 as explained above. It is understood that the flexible element 210 operable between compressed state 306 and the retracted state 406 imitates or mimics the human's mouth and the actions of blowing (or the expiratory effect) and inhaling (or the inspiratory effect). The inspiratory and expiratory effects provided by the flexible element 210 provides sexual stimulation to the female genitalia when the suction device 100 is positioned at vicinity of the female genitalia (or vagina). In an embodiment, the suction device 100 may be used by the female users for experiencing nipples suction.

Additionally, the actuator 224 may be configured with a plurality of rotating speed (or intensity modes). The user can adjust the rotating speed of the actuator 224 by providing input on the intensity control buttons 110. The plurality of rotating speed of the actuator 224 allows the user to alter a reciprocating speed of the reciprocating link 220, so as to adjust the suction and blowing intensities (or control the inspiratory and expiratory effects) of the flexible element 210 based on the user's preference. In other words, the stroke length 'L' is altered based on the user preference by providing input on the intensity control buttons 110. Wherein, the suction and blowing intensities (i.e. rate of attaining the compressed state 306 and the retracted state 406) of the flexible element 210 are controlled by altering the stroke length 'L' at various points in time in the entire masturbating process. The feature of the multiple rotating speeds for adjusting the blowing and suction intensities provides enhanced sexual stimulation to the female genitalia.

In an example embodiment, the device 100 may be configured with one of a rotating knob, a slider knob or a plurality of press buttons to select and alter the rotary speed the actuator 224 for controlling the rate of attaining the compressed state 306 and the retracted state 406 of the flexible element 210.

In one embodiment, the device 100 may be operatively connected to an external vacuum generator (not shown in Figures) for operating the flexible element 210 in the compressed state 306 and the retracted state 406.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A suction device, comprising:
- a hollow body;
- an accumulator assembly housed within the hollow body, the accumulator assembly comprising:
  - a first support structure and a second support structure,
  - a plurality of connecting members, each of the plurality of connecting members mounted to the first and second support structures at regular intervals along circumference portions of the first and second support structures and oriented along a longitudinal axis of the accumulator assembly, and
  - a flexible element comprising a first end portion secured to the first support structure and a second end portion secured to the second support structure, the flexible element disposed in a space defined by the first and second support structures and the plurality of connecting members; and
- a drive mechanism operatively coupled to the accumulator assembly, the drive mechanism configured to operate the flexible element to a compressed state and a retracted state by driving the second support structure between a first position and a second position relative to the first support structure, respectively.

2. The suction device as claimed in claim 1, wherein the drive mechanism comprises:
- a rotating cam comprising an inclined surface and a base surface;
- a reciprocating link comprising a primary end movably coupled to the inclined surface and a secondary end coupled to the second support structure; and
- an actuator comprising a shaft connector operatively coupled to the base surface of the rotating cam, the actuator configured to provide a rotary motion to the shaft connector and the rotating cam.

3. The suction device as claimed in claim 2, wherein the rotary motion of the rotating cam facilitates the reciprocating link to traverse between a first point and a second point on the inclined surface along a horizontal plane of the rotating cam.

4. The suction device as claimed in claim 3, wherein the reciprocating link operable between the first point and the second point on the inclined surface of the rotating cam drives the second support structure to the first position and the second position relative to the first support structure, respectively.

5. The suction device as claimed in claim 4, wherein the second support structure operated to the first position enables the flexible element to operate in the compressed state by blowing out air from within the flexible element through a central opening configured at a proximal portion of the hollow body, and
- wherein the second support structure operated to the second position enables the flexible element to operate in the retracted state by drawing air within the flexible element through the central opening of the hollow body.

6. The suction device as claimed in claim 5, wherein the flexible element operable between the compressed state and the retracted state produces inspiratory and expiratory effects, respectively, wherein the inspiratory and expiratory effects provided by the flexible element provides sexual stimulation to female genitalia when the suction device is positioned at vicinity of the female genitalia.

7. The suction device as claimed in claim 3, wherein movement of the reciprocating link to the first point on the inclined surface results in a first eccentric distance between a first central axis of the rotating cam and a second central axis of the reciprocating link, and wherein the movement of the reciprocating link between the first point and the second point on the inclined surface results in a second eccentric distance.

8. The suction device as claimed in claim 2, wherein the actuator is configured with a plurality of rotating speed, wherein the plurality of rotating speed of the actuator allows controlling a rate of attaining the compressed state and the retracted state of the flexible element.

9. The suction device as claimed in claim 1, wherein the second support structure operable between the first position and the second position alters a length and shape of each of the plurality of connecting members, for facilitating the flexible element to be operated between the compressed state and the retracted state, respectively.

10. The suction device as claimed in claim 1, wherein the flexible element is made of silicone.

11. The suction device as claimed in claim 1, wherein the first support structure is an open configuration for facilitating inspiratory and expiratory effects when the flexible element is operated between the retracted state and the compressed state, respectively, and wherein the second support structure is a closed configuration.

12. The suction device as claimed in claim 1, further comprising:

a power source operatively coupled to the drive mechanism, the power source configured to provide one of an alternating current output and a direct current output to the drive mechanism for operating the suction device.

13. A suction device, comprising:

a hollow body;

an accumulator assembly housed within the hollow body, the accumulator assembly comprising:

a first support structure and a second support structure, a plurality of connecting members, each of the plurality of connecting members mounted to the first and second support structures at regular intervals along circumference portions of the first and second support structures and oriented along a longitudinal axis of the accumulator assembly, and a flexible element comprising a first end portion secured to the first support structure and a second end portion secured to the second support structure, the flexible element disposed in a space defined by the first and second support structures and the plurality of connecting members; and a drive mechanism operatively coupled to the accumulator assembly, the drive mechanism comprising:

a rotating cam comprising an inclined surface and a base surface, a reciprocating link comprising a primary end movably coupled to the inclined surface and a secondary end coupled to the second support structure, and an actuator comprising a shaft connector operatively coupled to the base surface of the rotating cam, the actuator configured to provide a rotary motion to the shaft connector and the rotating cam, wherein the drive mechanism is configured to operate the flexible element to a compressed state and a retracted state by driving the second support structure between a first position and a second position relative to the first support structure, respectively.

14. The suction device as claimed in claim 13, wherein the rotary motion of the rotating cam facilitates the reciprocating link to traverse between a first point and a second point on the inclined surface along a horizontal plane of the rotating cam.

15. The suction device as claimed in claim 14, wherein the reciprocating link operable between the first point and the second point on the inclined surface of the rotating cam drives the second support structure to the first position and the second position relative to the first support structure, respectively.

16. The suction device as claimed in claim 15, wherein the second support structure operated to the first position enables the flexible element to operate in the compressed state by blowing out air from within the flexible element through a central opening configured at a proximal portion of the hollow body, and wherein the second support structure operated to the second position enables the flexible element to operate in the retracted state by drawing air within the flexible element through the central opening of the hollow body.

17. The suction device as claimed in claim 16, wherein the flexible element operable between the compressed state and the retracted state produces inspiratory and expiratory effects, respectively, wherein the inspiratory and expiratory effects provided by the flexible element provides sexual stimulation to female genitalia when the suction device is positioned at vicinity of the female genitalia.

18. The suction device as claimed in claim 13, wherein the actuator is configured with a plurality of rotating speed, wherein the plurality of rotating speed of the actuator allows controlling a rate of attaining the compressed state and the retracted state of the flexible element.

19. The suction device as claimed in claim 13, wherein the second support structure operable between the first position and the second position alters a length and shape of each of the plurality of connecting members, for facilitating the flexible element to be operated between the compressed state and the retracted state, respectively.

20. The suction device as claimed in claim 13, wherein the flexible element is made of silicone.

* * * * *